Figure 1:
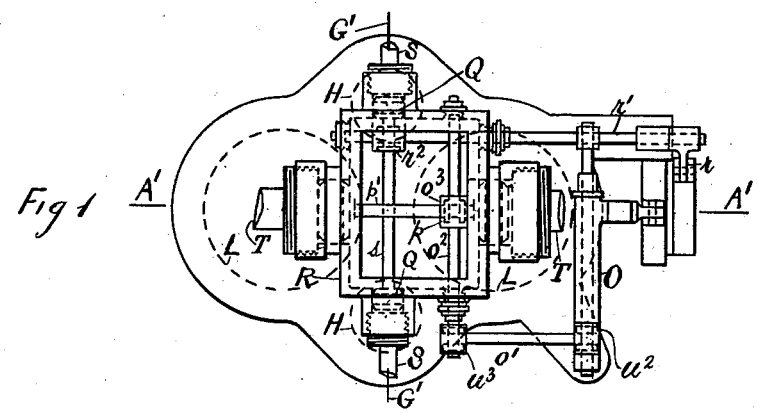

No. 671,386. Patented Apr. 2, 1901.
A. J. PEET.
COMPOUND ENGINE.
(Application filed June 27, 1900.)
(No Model.) 4 Sheets—Sheet 1.

WITNESSES:
August Johnston
Wm. Franck

INVENTOR
Alexander J. Peet
BY
A. A. de Bonneville
ATTORNEY

No. 671,386. Patented Apr. 2, 1901.
A. J. PEET.
COMPOUND ENGINE.
(Application filed June 27, 1900.)
(No Model.) 4 Sheets—Sheet 2.
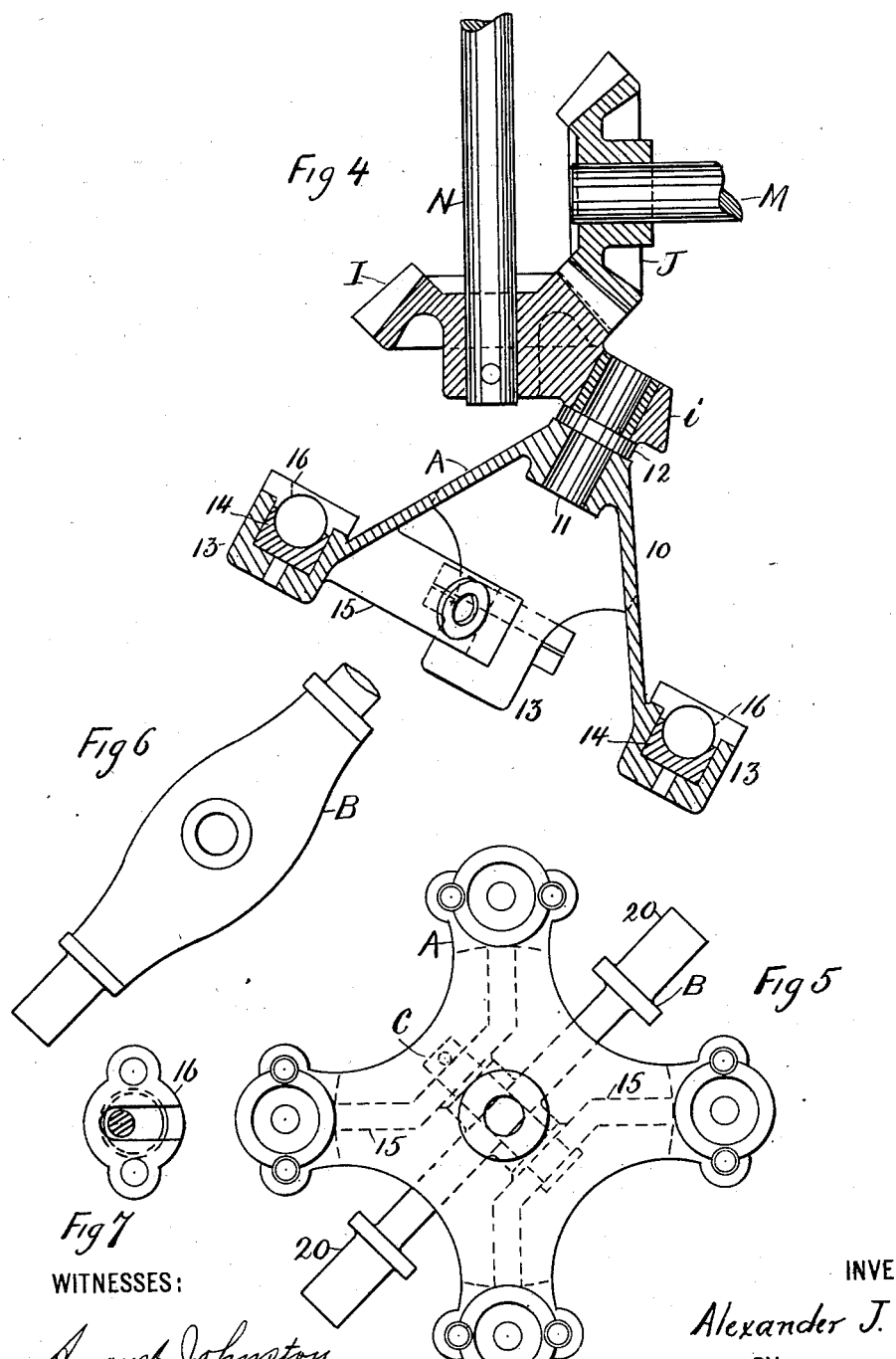
INVENTOR
Alexander J. Peet.
BY
A. A. de Bonneville
ATTORNEY
WITNESSES:

No. 671,386. Patented Apr. 2, 1901.
A. J. PEET.
COMPOUND ENGINE.
(Application filed June 27, 1900.)
(No Model.) 4 Sheets—Sheet 3.
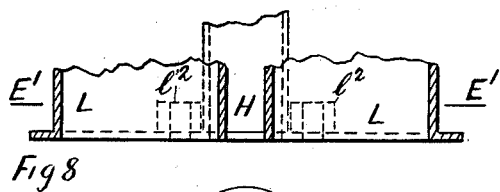
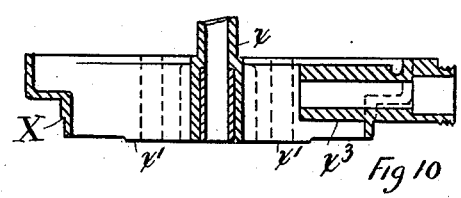
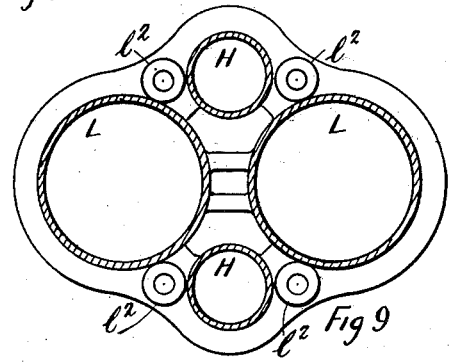
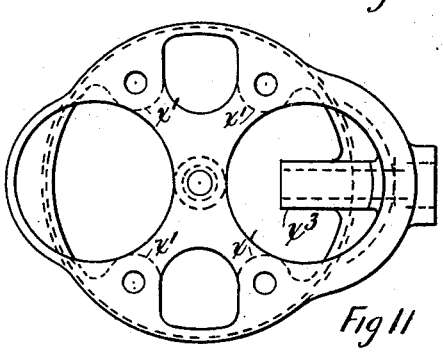
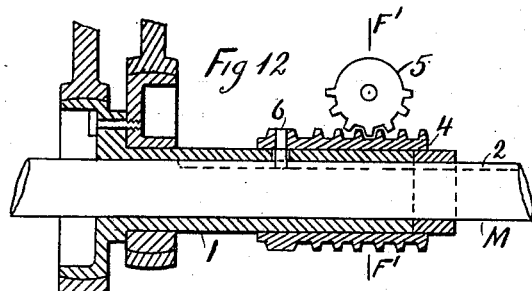
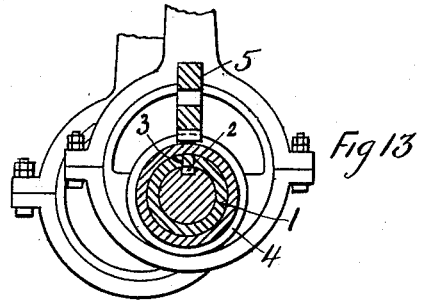
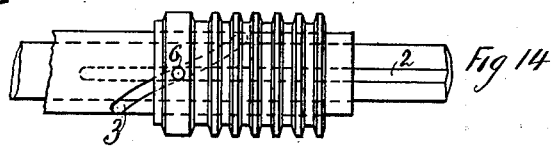
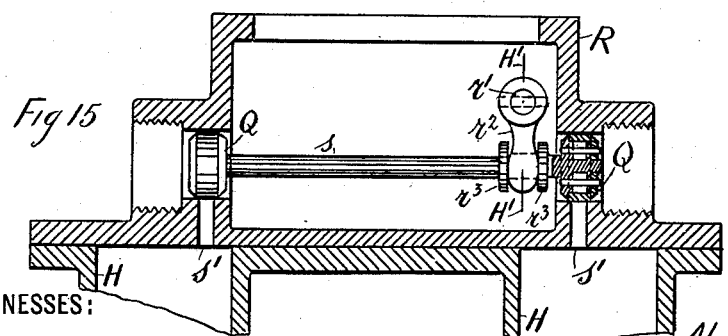
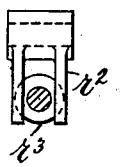
WITNESSES:
August Johnston
Wm. Franel
INVENTOR
Alexander J. Peet
BY
A. A. de Bonneville
ATTORNEY No. 671,386. Patented Apr. 2, 1901.
A. J. PEET.
COMPOUND ENGINE.
(Application filed June 27, 1900.)
(No Model.) 4 Sheets—Sheet 4.
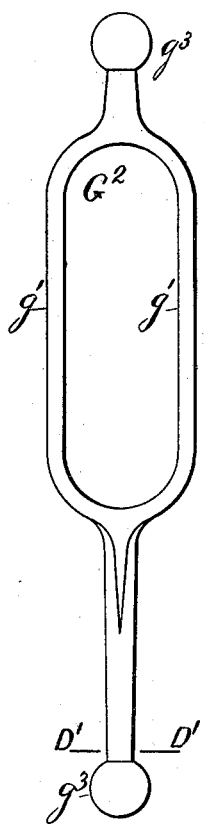
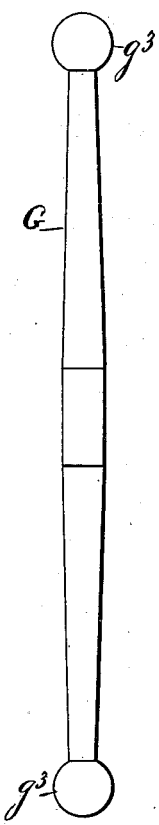
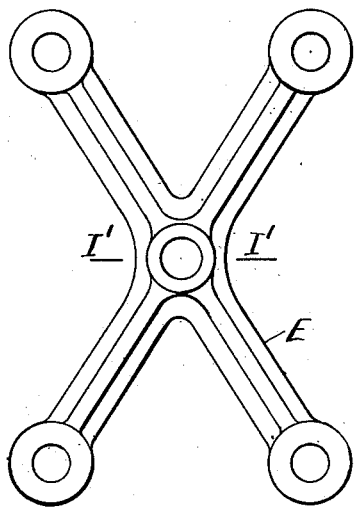
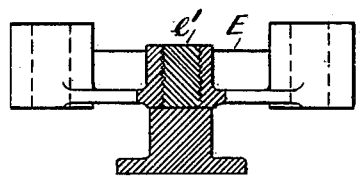
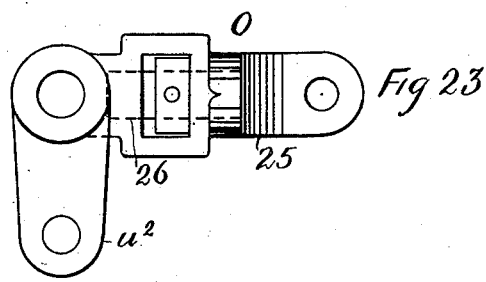
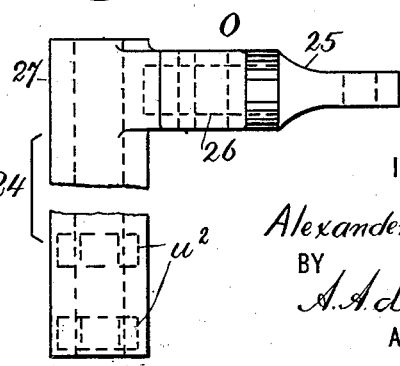
WITNESSES:
August Johnston
Wm. Franel
INVENTOR
Alexander J. Peet
BY
A. A. de Bonneville
ATTORNEY
THE NORRIS PETERS CO., PHOTO-LITHO., WASHINGTON, D. C.

UNITED STATES PATENT OFFICE.

ALEXANDER J. PEET, OF BROOKLYN, NEW YORK.

COMPOUND ENGINE.

SPECIFICATION forming part of Letters Patent No. 671,386, dated April 2, 1901.

Application filed June 27, 1900. Serial No. 21,733. (No model.)

*To all whom it may concern:*

Be it known that I, ALEXANDER J. PEET, a citizen of the United States, and a resident of the borough of Brooklyn, in the county of Kings and State of New York, have invented certain new and useful Improvements in Multiple-Cylinder Compound Engines, of which the following is a specification.

The object of this invention is the production of a multiple-cylinder engine of compact form, light weight, and novel construction operating without the use of a fly-wheel.

To these ends my invention consists of the combination of parts shown in the drawings, described in the specification, and pointed out in the claims.

Figure 2:
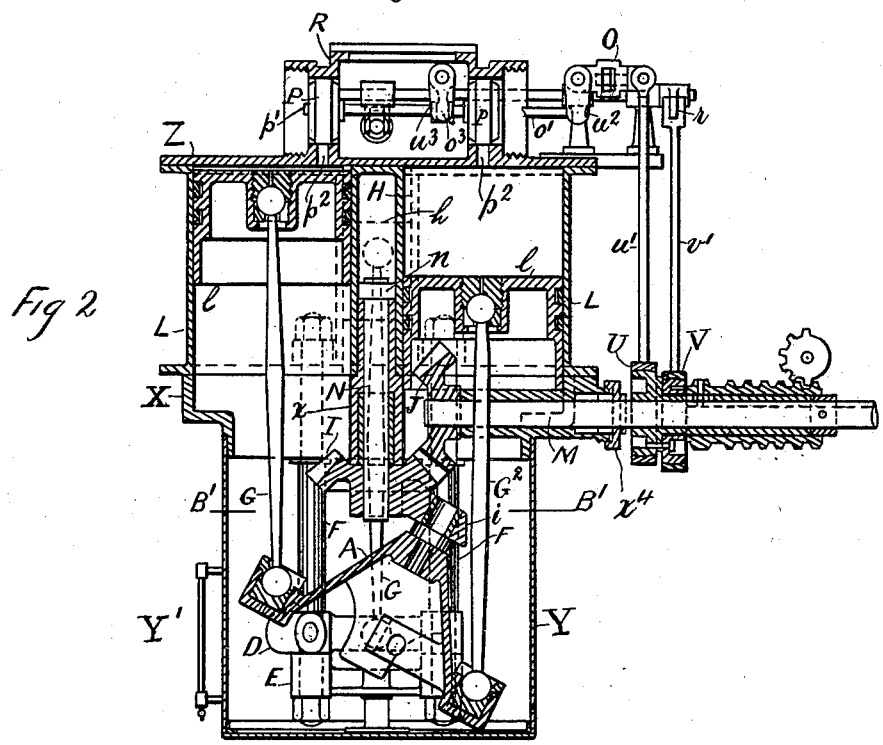
Figure 3:
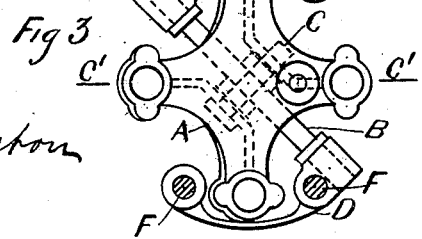

Figure 1 shows a partial top view of my invention. Fig. 2 represents a vertical section taken on the line A' A' of Fig. 1. Fig. 3 is a partial section taken on the line B' B' of Fig. 2. Fig. 4 shows a partial section on the line C' C' of Fig. 3. Fig. 5 is a top view of the pyramidically-shaped lever and supporting-beam. Fig. 6 represents an elevation of the supporting-beam. Fig. 7 shows a top view of a cap for pyramidal joint with a section on a line, as D' D' of Fig. 17. Fig. 8 is a partial section through the cylinders on line A' A' of Fig. 1. Fig. 9 represents a section on line E' E' of Fig. 8. Fig. 10 shows a section of frame on line A' A' of Fig. 1. Fig. 11 is a top view of Fig. 10. Fig. 12 represents a section through reversing-gear on line A' A' of Fig. 1. Fig. 13 shows a section on the line F' F' of Fig. 12. Fig. 14 is a partial top view of Fig. 12. Fig. 15 represents a section on the line G' G' of Fig. 1. Fig. 16 shows a partial section on the line H' H' of Fig. 15. Figs. 17 and 18 represent an elevation and plan of a special connecting-rod. Figs. 19 and 20 show an elevation and plan of a connecting-rod. Fig. 21 is a plan of foot. Fig. 22 shows a section on line I' I' of Fig. 21. Fig. 23 represents an elevation of bell-crank. Fig. 24 shows a plan of Fig. 23.

The engine constituting the subject-matter of this invention can be constructed with various combinations of cylinders and in this instance is shown to consist of the two high-pressure cylinders H H and the two low-pressure cylinders L L, containing, respectively, the pistons $h$ and $l$. Connecting-rods G G² transmit motion from the pistons to a conically-shaped lever A, which is connected to the crank $i$, extending from the bevel-wheel I. The bevel-wheel I meshes with the bevel-wheel J, which is secured on the main shaft M. The cylinders are capped by a steam-reservoir R and are supported on the frame X. A casing Y extends from the frame and incloses all the working mechanism below the cylinders. Bolts F F tie the frame X and cylinders and also secure the footpiece E and supports D.

On the horizontal shaft M are secured the eccentrics (see Figs. 1, 2, 15, and 16) V U, with their rods $v'$ $u'$. The eccentric-rod $v'$ operates the lever $r$, which actuates the spindle $r'$, to which is attached the forked lever $r^2$, operating between the collars $r^3$ to give motion to the valve-rod $s$, and consequently to the high-pressure valves Q Q. The eccentric-rod $u'$ operates the bell-crank O, one arm of which, $u^2$, is connected to the link $o'$, which swings the lever $u^3$, fastened on the spindle $o^2$, and on this spindle is also secured (as for the high-pressure cylinders) a forked lever $o^3$, operating between the collars $p$ on the valve-spindle $p'$ to actuate the low-pressure valves P P.

The centers of the two eccentrics are bolted together, as shown, or cast in one piece and extend over the main shaft M, constituting a sleeve 1. (See Figs. 2, 12, 13, and 14.) This sleeve contains a slot 3, running diagonally across its face, and the shaft M contains a slot 2, running in the direction of its axis. On the sleeve 1 there is an outer sleeve 4, with teeth encircling the same, constituting a rack with which a gear 5 meshes. The outside sleeve 4 has attached to it a pin 6, which slides in the slots 3 and 2 when the gear-wheel 5 is turned. The said gear only contains teeth for half its circumference, so as to prevent the reversing-gear being moved through a greater angle than necessary. When the said gear 5 is turned, the sleeve 1 is turned relatively to the shaft M, thus operating the reversing-gear.

Referring to Figs. 2, 3, 8, 9, 10, and 11, it will be seen that the connecting-bolts F F F F pass through bosses $l^2$ $l^2$ and $x'$ $x'$. The frame X has a central vertical sleeve $x$, which constitutes a bearing and support for the shaft N, which turns in the same and is held in position by the collar $n$. The horizontal sleeve $x^3$ constitutes a bearing for the horizontal shaft M, a stuffing-box $x^4$ preventing the escape of any steam or vapor.

Referring now to Figs. 2, 3, 4, 5, 6, and 7, the pyramidically-shaped lever A is shown swinging on the supporting-lever B, turning on its trunnions 20, and connected to the said supporting-lever B by means of the pin C, securing thereby motions at right angles to each other and constituting a universal joint. At the apex of A is secured the pin 11 for the crank $i$, extending from the bevel-wheel I. In the lower periphery of A are attached the boxes 13, with suitable brasses 14 and caps 16 for the lower ends $g^3$ of the connecting-rods G $G^2$. Supporting-arms 15 are cast with A, connecting the boxes 13 and forming the supports for the pin C. It will be evident that when the conically-shaped lever A is in the position shown in the drawings and a push is exerted on the boxes 13 by a connecting-rod of a high-pressure piston the pin 11 will turn the crank $i$ with the shaft N and bevel-wheel I, and after having made ninety degrees one of the low-pressure connecting-rods will come in play, and thus continued by the other high and low piston-rods in like manner produces a uniform and easy motion for the bevel-wheel I, and consequently communicates the same to the main shaft M.

The bell-crank O (see Figs. 1, 2, 23, and 24) is shown to consist of the cylindrical barrel 27, with forks $u^2$ and arm 25. The arm 25 swings on the spindle 26 to allow for the oscillations of the eccentric-rod $u'$.

The connecting-rods G consist of a single central portion with the ball ends $g^3$, and the body of the connecting-rod $G^2$ consists of two portions $g'$ $g'$ to enable them to straddle the sleeve $x^3$ of the frame X.

The cylinder-head Z (see Figs. 1, 2, and 15) has cast therewith the steam-reservoir R. Steam enters through pipes S S and after passing the valves Q Q enters the high-pressure cylinders by means of the ports $s'$ $s'$, and upon the upstroke of said pistons enters the steam-receiver R, and from thence is led into the low-pressure cylinders through the ports $p^2$ $p^2$ by means of the valves P P and returning through said ports, always under control of the valves P P, exhausts through the pipes T T.

The casing Y is partially filled with oil for lubrication, the gage-glass Y' being attached to indicate its level.

It will be evident that the bevel-gears I and J could be dispensed with and a crank secured to the shaft N, actuated by the pin 11 of the conically-shaped lever A, thus constituting the shaft N the main driving-shaft of the engine.

It is evident that this novel device can be used for steam or any other vapor.

Having described my invention, I desire to secure by United States Letters Patent and claim—

1. In an engine, multiple cylinders, pistons actuating in the cylinders, a crank-shaft, a pyramidically-shaped lever swinging on a horizontal pin, a lever oscillating on trunnions supporting said pin, connecting-rods connecting the pistons and pyramidical lever, in combination with a valve-gear actuated by the crank-shaft, comprising eccentrics, each eccentric moving two piston-valves secured to one valve-stem, operating over the ports of two cylinders, a steam-reservoir cast with the cylinder-head, spindles located in said reservoir actuated by links connected to the eccentric-rods, forked levers secured to the spindles in the steam-reservoir, collars on the valve-stems, between which the forked levers operate to move the valves substantially as described.

2. In an engine, multiple cylinders, a steam-reservoir carried on the cylinders, pistons actuating in the cylinders, a pyramidically-shaped lever swinging on a horizontal pin, a lever oscillating on trunnions supporting said pin, connecting-rods connecting the pistons and pyramidical lever, a frame supporting the cylinders, supports for the oscillating lever, a footpiece holding the supports in place, bolts connecting the cylinders, frame, supports and footpiece, a casing secured to frame constituting an oil-reservoir for pyramidical lever and adjacent parts, a vertical crank-shaft with bevel-wheel and crank, the crank connected to pyramidical lever, a horizontal shaft with bevel-wheel, said wheel meshing with bevel-wheel on vertical shaft, in combination with a valve-gear, comprising eccentrics, reversing-gear, piston-valves, two of said valves secured to each valve-stem and operating on top of cylinders substantially as described.

3. An engine comprising cylinders L L, and H, H, pistons $l$, $l$, $h$, actuating in said cylinders, connecting-rods G, $G^2$, connecting said pistons with pyramidically-shaped lever A, a frame X supporting the cylinders, rods F, F, F, F clamping the cylinders and frame, a foot E and supports D secured to the rods F, F, F, F, a cylinder-head Z covering the cylinders, a steam-reservoir contained in said cylinder-head, high-pressure valves Q, Q, and low-pressure valves P, P, actuating in said steam-reservoir, a reversing-gear consisting of eccentrics U, V with appurtenances, actuated by shaft M and operating the said valves.

Signed at New York, in the county of New York and State of New York, this 25th day of June, A. D. 1900.

ALEXANDER J. PEET.

Witnesses:
AUGUST JOHNSTON,
WM. P. FRANCL.